United States Patent
Clouinard

(10) Patent No.: US 7,242,867 B1
(45) Date of Patent: Jul. 10, 2007

(54) OPTICAL CROSS CONNECT SYNCHRONIZATION ARCHITECTURE AND METHOD

(75) Inventor: Michel Clouinard, Laval (CA)

(73) Assignee: CIENA Corporation, Linthicum, MD (US)

( * ) Notice: Subject to any disclaimer, the term of this patent is extended or adjusted under 35 U.S.C. 154(b) by 1036 days.

(21) Appl. No.: 10/284,666

(22) Filed: Oct. 31, 2002

(51) Int. Cl.
*H04B 10/00* (2006.01)

(52) U.S. Cl. .............................. 398/52; 398/45; 398/54

(58) Field of Classification Search ............. 398/45–57
See application file for complete search history.

(56) References Cited

U.S. PATENT DOCUMENTS

| | | | |
|---|---|---|---|
| 5,663,820 A * | 9/1997 | Shiragaki | 398/50 |
| 6,943,925 B1 * | 9/2005 | Islam | 359/108 |
| 7,110,669 B2 * | 9/2006 | Ofek et al. | 398/47 |

* cited by examiner

Primary Examiner—Agustin Bello

(74) Attorney, Agent, or Firm—Clements Walker; Christopher L. Bernard; Tyler S. Brown

(57) ABSTRACT

A synchronization architecture for a cross connect switch having an ingress stage, a center stage, and an egress stage utilizes optical interfaces and media to distribute a system clock and frame sync to the I/O modules and switch fabric so that system can reassign the source/destination of the numerous STS-1 streams. A main synchronization module encodes the frame sync within the system clock. An optical interface converts the encoded sync signal to an optical sync signal which is sent over optical media to a secondary synchronization module which extracts the encoded frame sync from the optical sync signal and recovers the system clock. The system clock may be frequency multiplied or divided as necessary for distribution to the ingress and egress switch fabrics as well as the I/O modules. The sync reference may be externally provided or derived from an optical input data signal and forwarded to the main sync module using an optical pathway.

9 Claims, 6 Drawing Sheets

7,242,867 B1

OPTICAL CROSS CONNECT SYNCHRONIZATION ARCHITECTURE AND METHOD

BACKGROUND OF THE INVENTION

1. Field of Invention

The invention generally relates to a synchronization architecture and method for an optical cross connect. More specifically, the invention relates to synchronization architectures and methods particularly well-suited to a SONET/SDH TDM cross connect switch using a CLOS architecture.

2. Description of Related Art

Synchronization is required for SONET/SDH systems. After all, SONET stands for Synchronous Optical Network and SDH stands for Synchronous Digital Hierarchy. In the case of a large scalable switch using a CLOS architecture, the synchronization information must be carried to all the ingress/egress shelves from the center stage shelf. A basic method to pass the synchronization information is to electrically interconnect all the shelves with cables carrying a clock signal and a frame signal as well as a return clock signal used to support the Line Time mode of operation. This approach suffers from the following problems:

Generation of EMI (electromagnetic interference) noise from the high-frequency electrical clock signals being distributed to the shelves Possible signal integrity issues due to attenuation on long cable interconnects Connector density issue on the center stage shelf

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

As used herein, "Stage 1" is associated with the Ingress data path, "Stage 3" is associated with the Egress data path and "Stage 2" is associated with the Center stage of a CLOS type of switching array.

The inventive synchronization strategy has particular application to a scalable SONET/SDH TDM switch using CLOS architecture. Such a switch can grow to reach terabit capability and beyond but presents a quite challenging synchronization difficulty between the stages. This type of system conventionally uses optical connections between switch stages (stage 1-3 and stage 2) to carry the data traffic and electrical connections to distribute the timing signal between the stages. Instead of using electrical clock signal distribution, an optical media is used to distribute and collect the system synchronization according to the inventive techniques.

System synchronization is required for SONET/SDH cross connect functionality, which is typically done by switch modules that implement a switching function at an STS-1 level. STS-1 switching can be achieved if all the incoming STS-1 signals at the ingress ports are precisely framed aligned. The STS-1 signals arriving from the I/O cards are typically not frame aligned due to their various origins in the network. The objective of the synchronization function is to provide a common system clock frequency and a common system frame reference to the I/O modules and switch fabric so that system can reassign the source/destination of the numerous STS-1 streams as required by the user.

Figure 1:
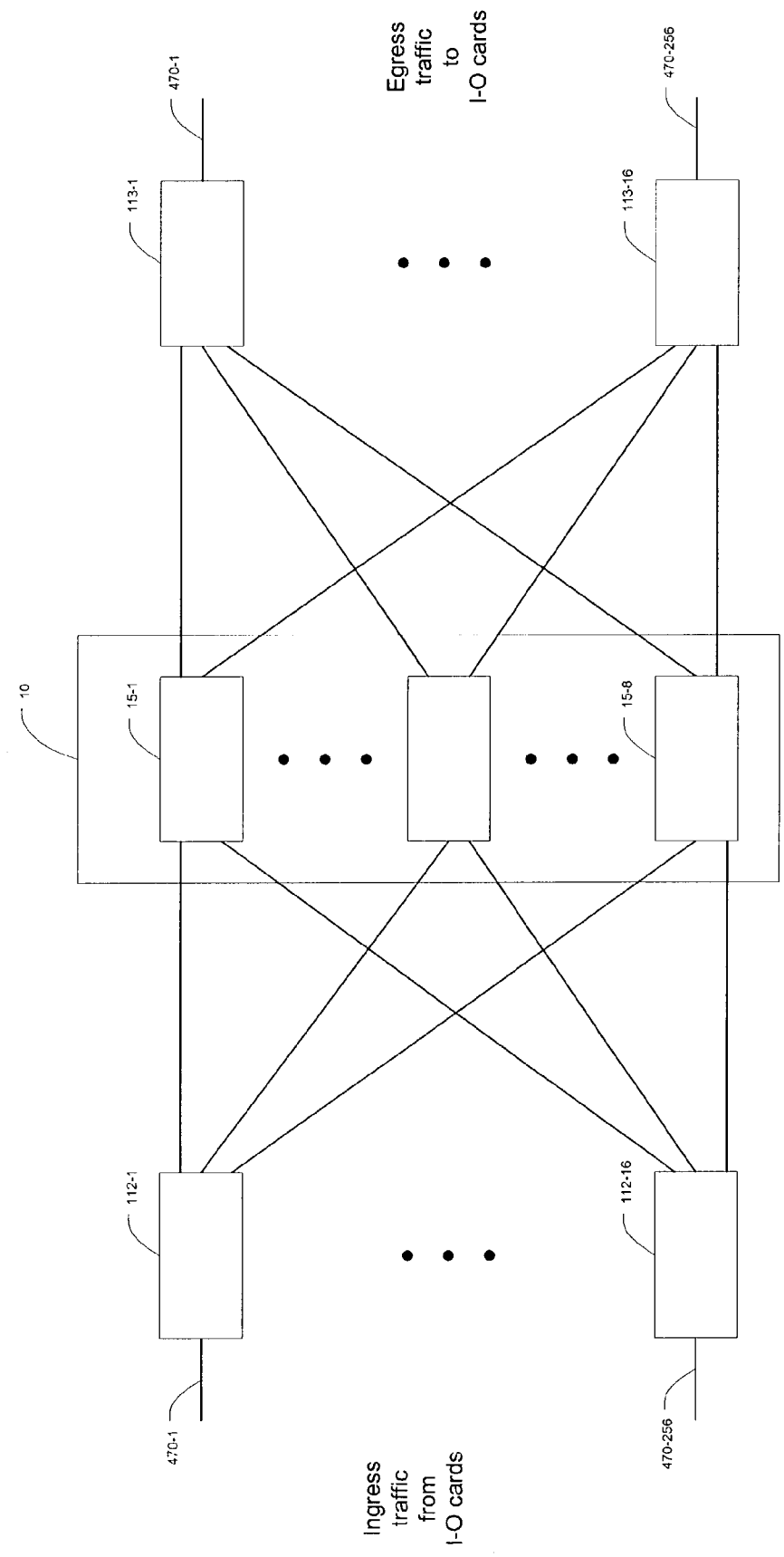
FIG. 1 illustrates the classical representation of a conventional switching system using the CLOS architecture.

FIG. 1 presents a high-level block diagram of a conventional cross connect switch using a CLOS architecture; it presents the flow of the traffic from Ingress ports to Egress ports. In this example, elements 112 are the Ingress switch stages and 113 are the Egress switch stages of the CLOS architecture and they include a plurality of optical ports, designated 470-1 to 470-256. Center stage switches 15 form the center stage 10 of the CLOS architecture. The system presented here has a maximum capacity of 2.56 Terabit/sec of switching capacity and the implementation of such a system requires many shelves of circuitry interconnected together all of which need to be precisely synchronized (same system clock and same SONET/SDH frame phase) for proper operation of the switch fabric.

Figure 2:
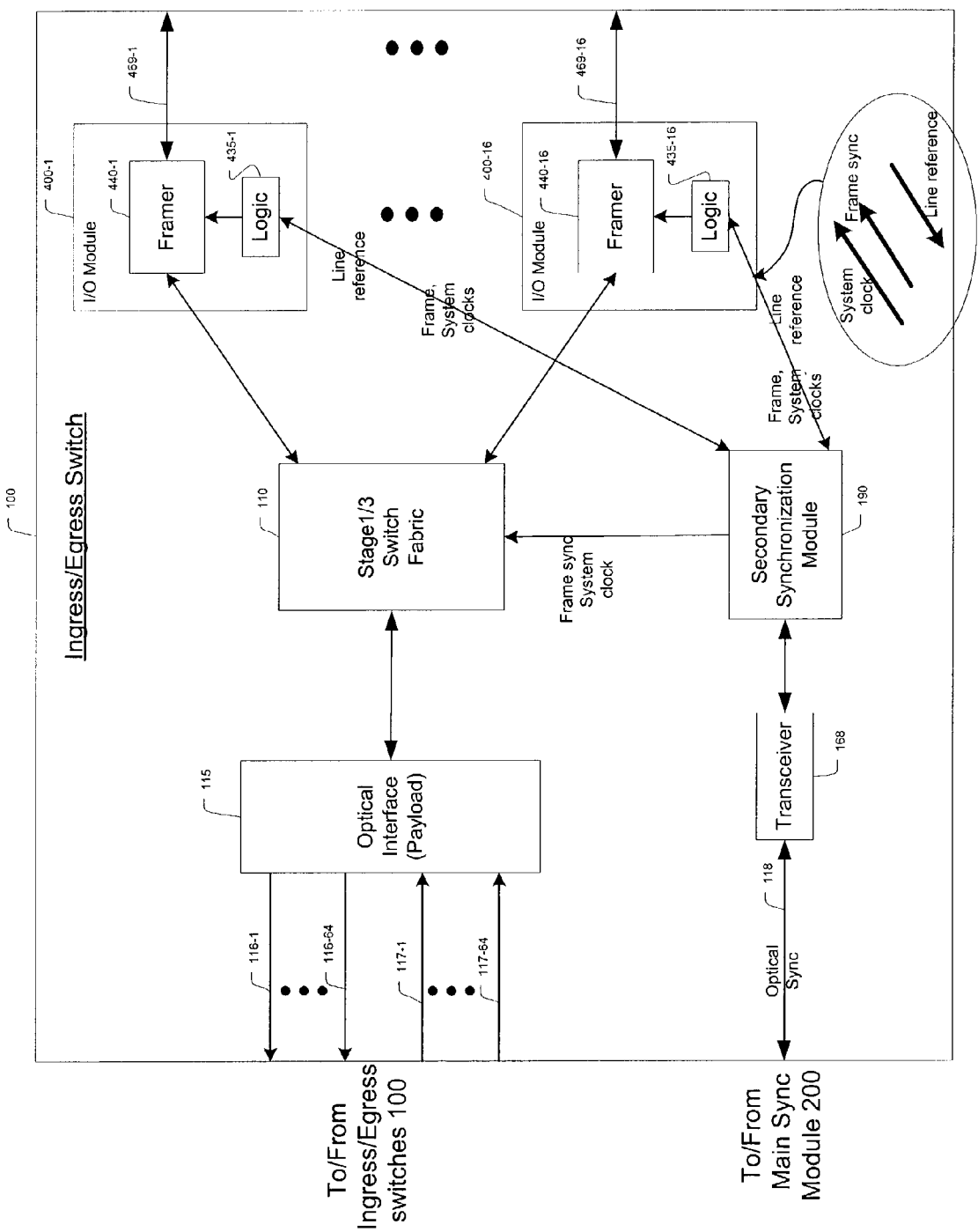
FIG. 2 illustrates a high-level block diagram of the ingress/egress switch, interconnection interface, and synchronization architecture according to the invention.

The synchronization architecture presented here describes a solution to two distinct problems:

Distribution of a system reference signal to all the I/O modules and switch fabrics Collection of a Line Timing reference from any of the I/O module FIG. 2 illustrates in more detail the major functional blocks comprising the Ingress/Egress switch 100. I/O modules 400 are optical port interfaces receiving an optical signal via ports 469 and converting the received optical signals to electrical signals. Each I/O module (e.g. I/O module 400-1) includes a conventional framer 440 for SONET/SDH framer functionality with payload data being passed to the Ingress/Egress switch fabric 110.

Optical interface 115 preferably utilizes parallel optics technology to handle the large number of parallel optical signals (payload data) to/from center stage switch 15 and transfers the payload data between Ingress/Egress switch fabric 110 and the center stage 15 via optical media 116, 117. For example, optical interface 115 may utilize a VCSEL (vertical cavity surface emitting laser) array.

Switch fabric 110 is the switch fabric supporting both the ingress and the egress data flows. The arrangement shown in FIG. 2, is called a "folded switch" architecture because the same switch fabric 110 handles both the ingress and egress data flows but the invention is not limited thereto and includes non-folded switches in which separate switch fabrics are used for the ingress and egress data flows.

Secondary synchronization module 190 is responsible for distributing system synchronization from the center stage 10 to Ingress/Egress switch fabric 110 and to I/O modules 400. As explained in more detail below, the optical sync signal is received from the main sync module 200 via optical media 118 and converted to an electrical signal by transceiver 168. Sync module 190 utilizes this converted optical sync signal from the main sync module 200 to derive a frame sync and system clock that are distributed to the I/O modules 400 as shown. Sync module 190 also distributes a frame sync and system clock to the Ingress/Egress switch fabric 110.

The high level block diagram of FIG. 2 shows the Ingress/Egress switch fabric 110 as a single element but the implementation includes a number of individual switch fabrics (e.g. 16 Ingress/Egress switch fabrics if the cross connect is of the scale and makeup described above).

Figure 3:
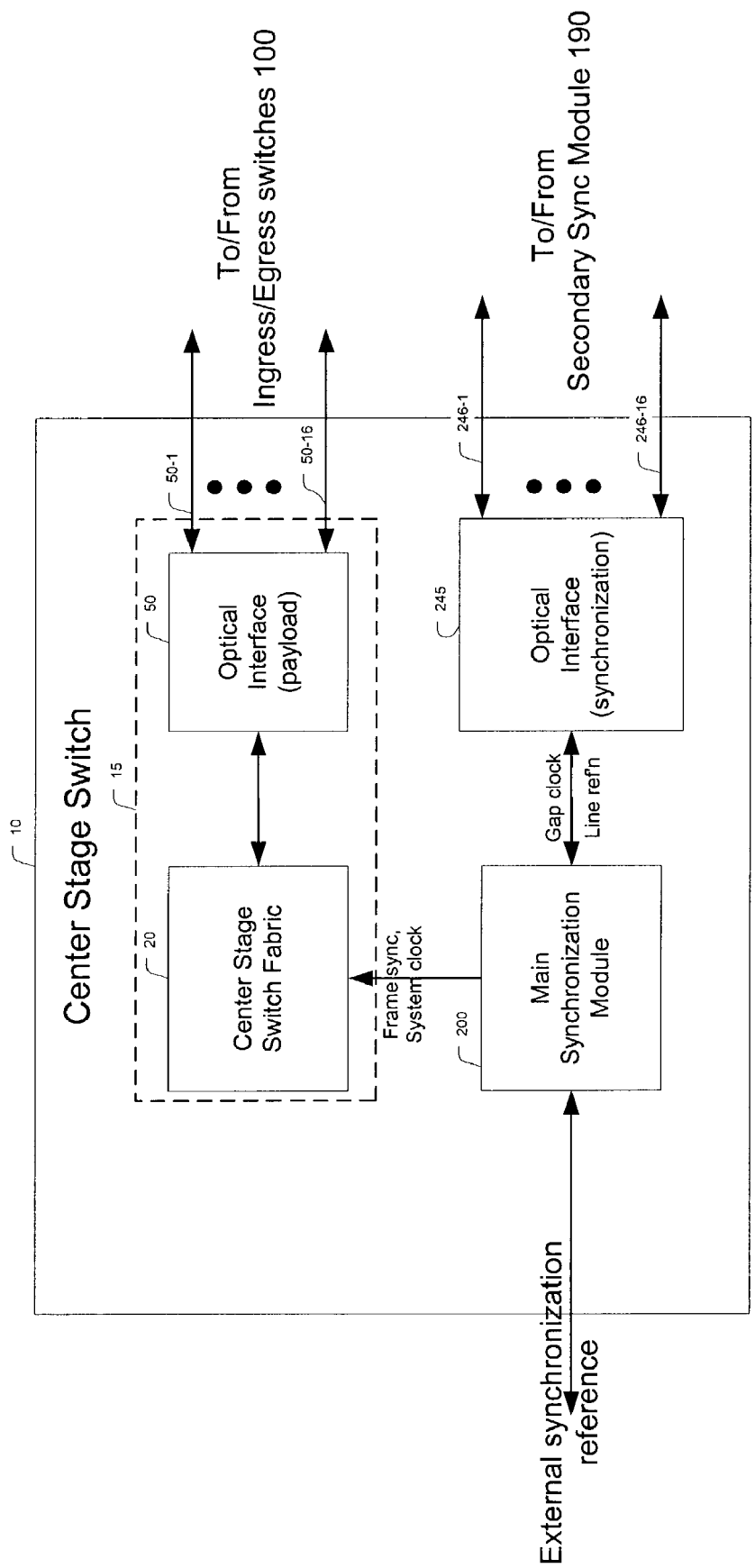
FIG. 3 illustrates a high-level block diagram of the center stage switch, interconnection interface, and synchronization architecture according to the invention.

FIG. 3 illustrates the center stage switch 10 in more detail. As shown, the center stage switch 10 includes a center stage switch fabric 15 connected to the ingress/egress switches 100 via optical interface 50. A main synchronization module 200 may receive an external synchronization reference as shown and is also optically connected to the secondary sync module 190 via optical interface 245. Center stage switch fabric 20 exchanges payload traffic between Ingress/Egress stages 100 using optical interface 50 which may be constructed with a parallel optical interface using, for example, a VCSEL (vertical cavity surface emitting laser) array. More specifically, optical signals carrying payload data from ingress/egress switch fabric 110 (via optical interface 115) are converted into electrical signals by optical interface 50 and passed to center stage switch fabric 20. After switching, the payload data passes through this same pathway back to egress switch fabric 110.

Main synchronization module 200 preferably locks on to an external synchronization reference which is typically a conventional BITS (Building Integrated Timing Supply) clock from a carrier's central office. Alternatively, the main sync module 200 may lock on to a line timing reference signal extracted from one of the optical ports on the I/O module 440. For example, I/O module 400-16 extracts a line timing signal from the input data signal being fed into the I/O module 440-16 and forwards the line reference via secondary sync block 190, transceiver 168 and optical interface 245 to the main sync module 200 as shown in FIGS. 2 and 3. The synchronization signal (line reference or external reference) is also filtered by main sync module 200 in order to attenuate the jitter and wander.

The resultant sync signal ("clock" or "system clock" in the drawings) is distributed by main sync module 200 to the various switch fabrics (ingress/egress switch fabrics 110 and center stage switch fabric 15) and to the I-O modules 400 in the system. Specifically, the system clock and frame sync are sent by main sync module 200 via an electrical connection to the center stage switch fabric 20. Significantly, the system clock is distributed optically via an optical connection (optical interface 245, optical media 118, and transceiver 168) to secondary sync modules 190 which then distribute the system clock to the I/O modules 400 and to the ingress/egress switch fabric 110.

Figure 4:
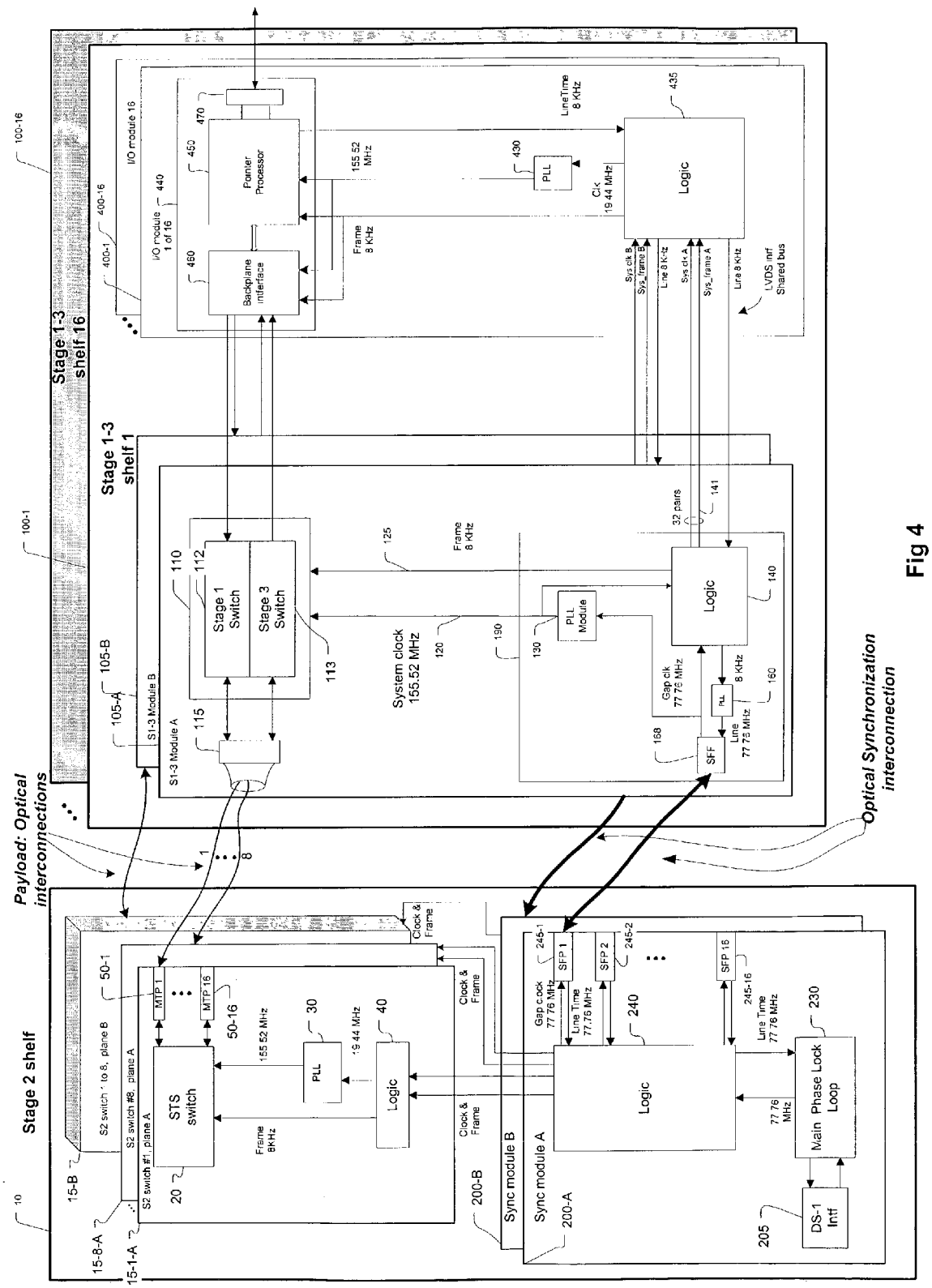
FIG. 4 illustrates detailed implementation of the inventive synchronization architecture in a scalable switch using a CLOS architecture.

FIG. 4 illustrates in more detail an implementation of the switching system as well as the synchronization strategy using an optical media to distribute and collect the synchronization signals. Main sync module 200 and secondary sync module 190 are the main elements of the synchronization architecture. Notice the presence of -A and -B planes which are representative of the hardware redundancy preferred by the inventive system.

Specifically, the main sync module 200 is shown in FIG. 4 as sync module A (200A) and sync module B (200B) indicating that this element is hardware-redundant. Equipment redundancy is also used for the center stage switch (S2 switch, planes A and B) as well as the ingress/egress switch 105 (S1–3 modules A and B). In further explanation of the numbering system, there are 8 center stage switches denoted 15-1 through 15-8 each of which has redundant hardware, thus the center stage switches are denoted 15-1-A through 15-8-A with the redundant hardware collectively indicated as 15-B. It should also be noted that there are 16 shelves of stage 1-3 (ingress/egress stage) 100 and 16 I/O modules 400 per ingress/egress stage 100. Thus, there are 16 ingress/egress switch fabrics 110 and 16×16=256 I/O modules 400 in the complete system. Therefore, it can be seen that there are a large number of switch fabrics and I/O modules each requiring precise synchronization signals to operate properly.

In the particular implementation shown in FIG. 3, the system clock distributed to the switches has a frequency of 77.76 MHz; this rate is a compromise driven by two conflicting requirements:

A high frequency is needed to fit in the pass band of commercially available optical transceivers.

A low frequency is needed to simplify the implementation of the gap decoder circuit located in logic 140 of the secondary sync module 190; this logic can be implemented in FPGA.

Figure 5:
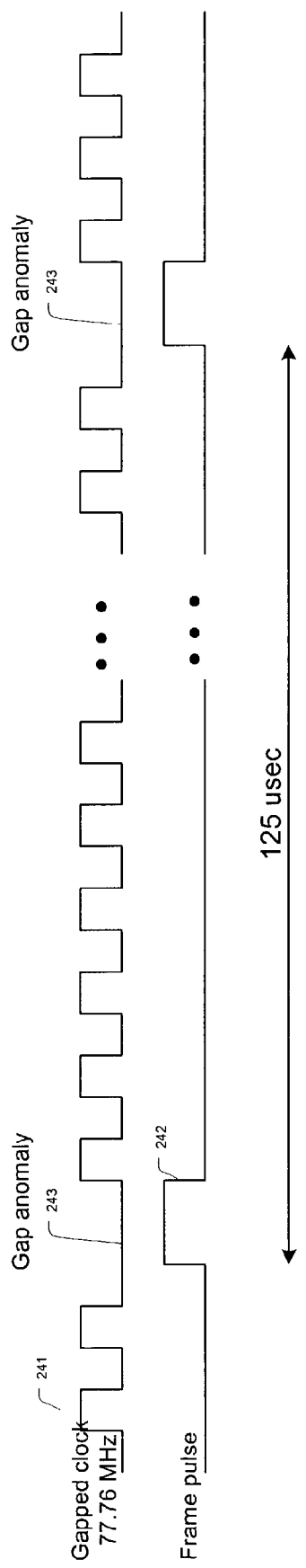
FIG. 5 illustrates a signal waveform used by the synchronization system of the invention.

The design intent of this approach is to minimize the number of interconnections needed between the center stage 10 and the ingress/egress stage shelves 100. This objective is achieved by encoding the frame pulse in the 77.76 MHz system clock used for system synchronization. The encoding function is performed by logic module 240 in the main sync module 200 and may be implemented with an FPGA. The encoding function performed by logic 240 includes removing one transition in a 77.76 MHz clock signal every 125 μsec, the resultant signal is shown in FIG. 5 where 241 is the gapped clock distributed over a fiber media 118 and 242 is the system frame pulse generated by logic 240 and distributed to center stage switches 15. Optical transceiver 245-1 distributes the gapped clock optically and is preferably packaged in a (SFP) Small Form Factor Pluggable module to accommodate progressive expansion scenario for the user.

FIG. 4 also shows a phase lock loop (PLL) module 130 being used as a frequency multiplier, which provides the system clock at the rate required by the switch fabric 110 (e.g., in this particular case 155.52 MHz which is twice the rate of the system clock but precisely in phase with the system clock via the PLL module 130). The PLL module 130 may be implemented with an EXOR phase comparator.

Figure 6:
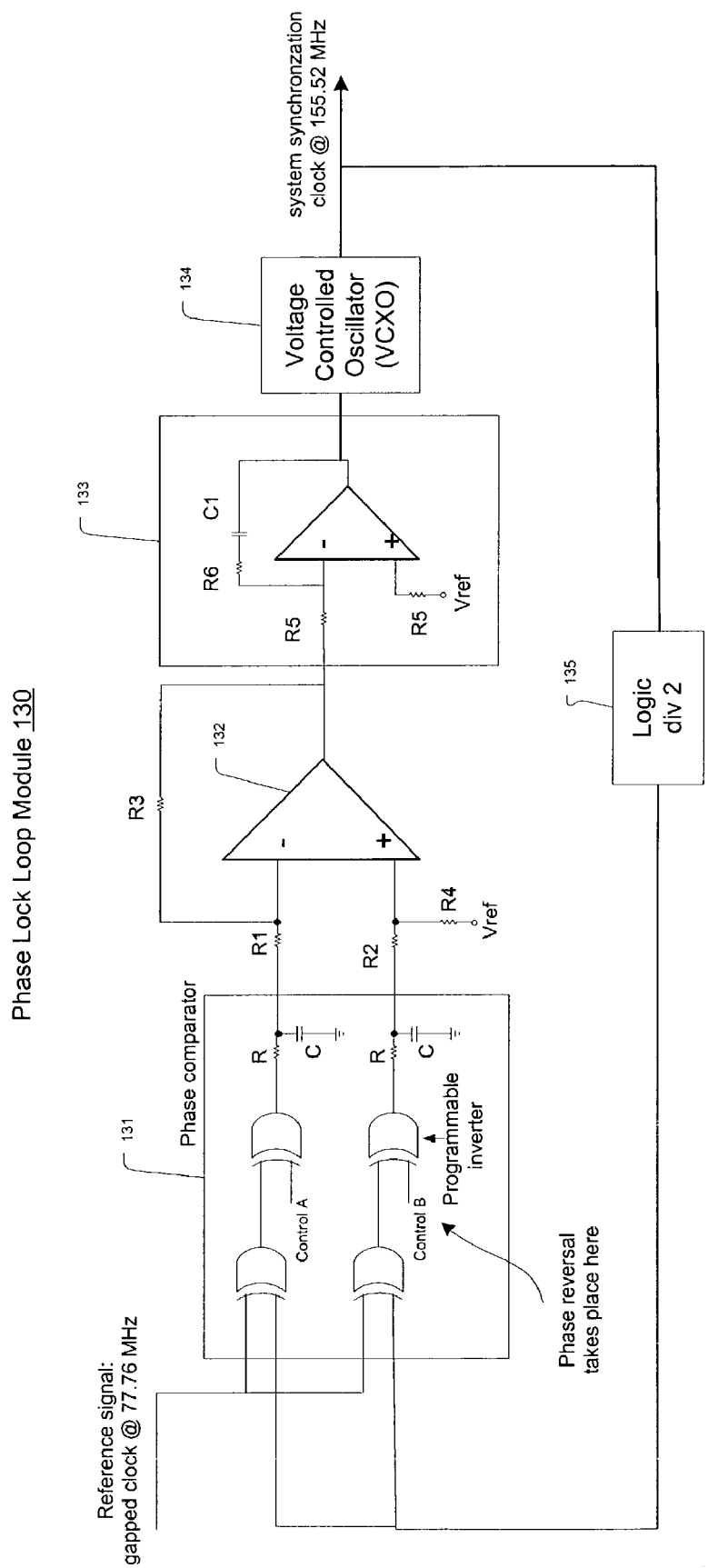
FIG. 6 illustrates an implementation of a phase lock loop according to the invention for the ingress/egress switch block and using an exclusive OR gate phase comparator.

A particular and preferred implementation of the PLL module 130 is shown in FIG. 6 and includes an EXOR phase comparator 131, differential amplifier 132, loop filter 133, a voltage controlled oscillator (VCXO) 134 and logic 135. The EXOR type of phase comparator 131 has the advantage of not introducing phase error information on a gap anomaly 243 (see gap anomaly in FIG. 5) which is important because the invention utilizes the gap anomaly to encode a frame pulse 242 as further shown in FIG. 5. Essentially, the PLL module frequency multiplies the reference clock while maintaining a precise phase relationship between the reference clock being input and the up-converted system clock being output.

Logic 140 of the sync module 190 processes the gapped clock signal received from optical transceiver 168 to locate the gap anomaly 243 and use that gap anomaly 243 to generate a frame reference (labeled "frame 8 Khz" in FIG. 4) for the ingress/egress switch fabric 112, 113 and for the SONET/SDH framer in the I/O modules 440 (system frame 141 (also designated "Sys_frame A" in FIG. 4)). Essentially, the gap anomaly 243 is detected and used to trigger the generation of frame pulse 242 (aka "frame sync"). In this way, the optical sync signal not only includes the system clock but also the encoded frame reference which makes sync signal distribution more efficient.

Logic module 140 utilizes an array of buffers to distribute the system frame clock at a slower rate (e.g. 19.44 MHz which is ¼ the rate of the system clock) to all the I-O modules 400-1 through 400-16 in the shelf. Similar logic modules 140 in the other shelves are structured in the same fashion and also distribute sync signals to the I/O modules in each respective shelf 100. Logic modules 435 distribute sync signals to pointer processor 450 and backplane interface.

Phase lock loop 430 is connected to the logic block 435 and receives the system clock therefrom. Phase lock loop 430 is used as a frequency multiplier taking the 19.44 MHz system clock from logic module 435 and generating a 155.52 MHz clock for framer/backplane interface 440 that is in precise phase relationship with the system clock. This completes the description of the distribution of the synchronization (System clock and frame) from center stage 10 to the ingress/egress stages 100 (including the ingress/egress switches 110, 113 and the I/O modules 400).

The center stage 10 also collects a synchronization signal (clock only) called "Line Time" in FIG. 4, this signal originates from pointer processor 450 and it consist of an 8 kHz clock derived from one of the receive optical ports 470. The signal is passed through logic blocks 435 and 140, which are used as buffers. The 8 kHz is translated to a 77.76 MHz clock by phase lock loop 160, the 77.76 MHz Line Time signal is transmitted by an optical transceiver 168 to main synchronization module 200 in the center stage shelf. Finally the 77.76 MHz clock is buffered by main sync logic 240 and passed to the main phase lock loop 230.

The inventive techniques that include using fiber optic media to distribute the synchronization information provides the following advantages over an electrical media:
  Immunity of sync signals to EMI and generation of less EMI overall
  Extended interconnect distance
  Improve connector density
  Homogenous shelf interconnects i.e. optical media for payload and synchronization signals.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A synchronization apparatus for a SONET/SDH cross connect switch having an ingress stage, a center stage, and an egress stage, comprising:
  a main synchronization module operatively connected to the center stage and receiving a synchronization reference, said main sync module locking on to the synchronization reference to generate a sync signal in phase with the synchronization reference,
  said main synchronization module encoding a frame sync signal within the sync signal being generated;
  an optical sync interface operatively connected to said main sync module and to the ingress and egress stages, said optical sync interface converting the sync signal into an optical sync signal,
  said optical sync interface distributing the optical sync signal to the ingress and egress stages;
  said optical sync interface recovering the sync signal from the optical sync signal at the ingress and egress stages after optically transmitting the optical sync signal to the ingress and egress stages;
  a secondary synchronization module operatively connected to said optical sync interface,
  said secondary synchronization module extracting the encoded frame sync signal encoded within the recovered sync signal and generating a system clock from the recovered sync signal;
  said secondary synchronization module comprising a phase lock loop module outputting a frequency multiplied system clock in phase with the system clock to ingress and egress switch fabrics;
  said phase lock loop module comprising an EXOR phase comparator operatively connected to a controllable oscillator, said EXOR phase comparator comparing phases of the frequency multiplied system clock and the system clock and outputting a phase difference to said controllable oscillator, wherein said controllable oscillator outputs the frequency multiplied system clock.

2. The synchronization apparatus according to claim 1, said main synchronization module removing a transition in the sync signal every frame period to encode the frame sync signal as a gap anomaly within the sync signal.

3. The synchronization apparatus according to claim 2, said secondary synchronization module utilizing the gap anomaly to extract the encoded frame sync signal.

4. The synchronization apparatus according to claim 2, wherein the frame period is 125 μsec.

5. The synchronization apparatus according to claim 1, said main synchronization module comprising a main phase lock loop receiving the synchronization reference, said main phase lock loop locking on to the synchronization reference to generate a sync signal in phase with the synchronization reference.

6. The synchronization apparatus according to claim 1, wherein the synchronization reference is a line time signal, said main synchronization module receiving the line time signal from an I/O module of the cross connect switch.

7. The synchronization apparatus according to claim 6, wherein the I/O module comprises a pointer processor receiving an input data signal from a receive optical port, the pointer processor sending the line time signal to said main synchronization module via said secondary synchronization module and said optical sync interface.

8. The synchronization apparatus according to claim 1, further comprising:
I/O modules operatively connected to said secondary synchronization module, each of said I/O modules comprising a framer; and
a logic module, said logic module receiving the system clock from said secondary synchronization module and distributing the system clock to the framers at a slower rate.

9. A synchronization apparatus for a SONET/SDH cross connect switch having an ingress stage, a center stage, and an egress stage, comprising:
a main synchronization module operatively connected to the center stage and receiving a synchronization reference, said main sync module locking on to the synchronization reference to generate a sync signal in phase with the synchronization reference,
said main synchronization module encoding a frame sync signal within the sync signal being generated;
an optical sync interface operatively connected to said main sync module and to the ingress and egress stages, said optical sync interface converting the sync signal into an optical sync signal,
said optical sync interface distributing the optical sync signal to the ingress and egress stages;
said optical sync interface recovering the sync signal from the optical sync signal at the ingress and egress stages after optically transmuting the optical sync signal to the ingress and egress stages;
a secondary synchronization module operatively connected to said optical sync interface,
said secondary synchronization module extracting the encoded frame sync signal encoded within the recovered sync signal and generating a system clock from the recovered sync signal;
wherein the synchronization reference is a line time signal, said main synchronization module receiving the line time signal from an I/O module of the cross connect switch; and wherein the I/O module comprises a pointer processor receiving an input data signal from a receive optical port, the pointer processor sending the line time signal to said main synchronization module via said secondary synchronization module and said optical sync interface.

* * * * *

UNITED STATES PATENT AND TRADEMARK OFFICE
CERTIFICATE OF CORRECTION

PATENT NO. : 7,242,867 B1 Page 1 of 1
APPLICATION NO. : 10/284666
DATED : July 10, 2007
INVENTOR(S) : Michel Clouinard It is certified that error appears in the above-identified patent and that said Letters Patent is hereby corrected as shown below:

On the title page, item [75]: "Michel Clouinard" should be corrected to --Michel Chouinard--

Signed and Sealed this

Twenty-first Day of August, 2007

JON W. DUDAS
*Director of the United States Patent and Trademark Office*